(12) United States Patent
Kitagawa et al.

(10) Patent No.: US 11,851,774 B2
(45) Date of Patent: Dec. 26, 2023

(54) CARBON DIOXIDE ELECTROLYTIC DEVICE

(71) Applicant: KABUSHIKI KAISHA TOSHIBA, Tokyo (JP)

(72) Inventors: Ryota Kitagawa, Setagaya (JP); Yusuke Kofuji, Yokohama (JP); Akihiko Ono, Kita (JP); Yuki Kudo, Yokohama (JP); Jun Tamura, Chuo (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 122 days.

(21) Appl. No.: 17/405,336

(22) Filed: Aug. 18, 2021

(65) Prior Publication Data

US 2022/0298651 A1    Sep. 22, 2022

(30) Foreign Application Priority Data

Mar. 18, 2021 (JP) ................... 2021-044778

(51) Int. Cl.
*C25B 1/23* (2021.01)
*C25B 15/027* (2021.01)
(Continued)

(52) U.S. Cl.
CPC .................. *C25B 1/23* (2021.01); *C25B 1/02* (2013.01); *C25B 9/19* (2021.01); *C25B 9/67* (2021.01);
(Continued)

(58) Field of Classification Search
None
See application file for complete search history.

(56) References Cited

U.S. PATENT DOCUMENTS

| | | | | | |
|---|---|---|---|---|---|
| 2,715,667 | A | * | 8/1955 | Auwarter | G01N 27/121 338/322 |
| 2004/0142225 | A1 | * | 7/2004 | Turpin | H01M 8/0247 429/444 |

(Continued)

FOREIGN PATENT DOCUMENTS

| | | |
|---|---|---|
| CN | 110344071 A | 10/2019 |
| JP | 2013-536319 A | 9/2013 |

(Continued)

OTHER PUBLICATIONS

Extended European Search Report dated Jun. 30, 2022, in corresponding European Patent Application No. 21192540.9, 13 pages.

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device according to an embodiment includes: an electrolysis cell including a reduction electrode, an oxidation electrode, a gas flow path supplying gas containing $CO_2$ to the reduction electrode, a liquid flow path supplying an electrolytic solution containing water to the oxidation electrode, and a diaphragm separating the reduction electrode from the oxidation electrode; a first supply path connected to the gas flow path; a first discharge path connected to the gas flow path; a first moisture content detecting unit installed in the first discharge path to detect a moisture content in the gas flowing in the first discharge path; a moisture content adjusting unit configured to adjust a moisture content supplied to the reduction electrode; and a control unit configured to control the moisture content adjusting unit based on a detection signal of the first moisture content detecting unit.

15 Claims, 5 Drawing Sheets

(51) Int. Cl.
*C25B 9/70* (2021.01)
*C25B 9/67* (2021.01)
*C25B 9/19* (2021.01)
*C25B 15/029* (2021.01)
*C25B 1/02* (2006.01)

(52) U.S. Cl.
CPC .............. *C25B 9/70* (2021.01); *C25B 15/027* (2021.01); *C25B 15/029* (2021.01)

(56) References Cited

U.S. PATENT DOCUMENTS

| | | | |
|---|---|---|---|
| 2004/0185315 A1* | 9/2004 | Enjoji | H01M 8/04156 429/513 |
| 2011/0114502 A1 | 5/2011 | Cole et al. | |
| 2014/0291162 A1 | 10/2014 | Sala et al. | |
| 2016/0226090 A1 | 8/2016 | Sone et al. | |
| 2017/0279134 A1 | 9/2017 | Reytier et al. | |
| 2021/0079542 A1 | 3/2021 | Kitagawa et al. | |
| 2022/0259745 A1* | 8/2022 | Danyi | C25B 1/04 |
| 2022/0307142 A1* | 9/2022 | Takasugi | C25B 9/23 |

FOREIGN PATENT DOCUMENTS

| | | |
|---|---|---|
| JP | 2014-528519 A | 10/2014 |
| JP | 2021-46574 A | 3/2021 |
| WO | WO 2012/118065 A1 | 9/2012 |
| WO | WO 2019/051609 A1 | 3/2019 |

* cited by examiner

CARBON DIOXIDE ELECTROLYTIC DEVICE

CROSS REFERENCE TO RELATED APPLICATIONS

This application is based upon and claims the benefit of priority from Japanese Patent Application No. 2021-044778, filed on Mar. 18, 2021; the entire contents of which are incorporated herein by reference.

FIELD

Embodiments disclosed herein relate generally to a carbon dioxide electrolytic device.

BACKGROUND

In recent years, depletion of fossil fuel such as petroleum or coal has been concerned, and expectation for sustainably usable renewable energy has been rising. An artificial photosynthesis technology has been investigated to generate a storable chemical energy source by electrochemically reducing carbon dioxide using renewable energy in terms of such energy and environmental issues. A carbon dioxide electrolytic device enabling the artificial photosynthesis technology includes, for example, an oxidation electrode that oxidizes water ($H_2O$) to produce oxygen ($O_2$), a reduction electrode that reduces carbon dioxide ($CO_2$) to produce carbon compounds, and a diaphragm that separates therebetween. The oxidation electrode and the reduction electrode of the carbon dioxide electrolytic device are connected to a power supply derived from renewable energy such as, for example, solar power generation, hydroelectric power generation, wind power generation, or geothermal power generation.

The reduction electrode of the carbon dioxide electrolytic device is disposed in contact with $CO_2$ gas flowing in a flow path, for example. The reduction electrode obtains a reduction potential of $CO_2$ from the power supply derived from renewable energy, thereby reducing $CO_2$ to produce carbon compounds such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), and ethylene glycol ($C_2H_6O_2$). In such electrochemical reduction of $CO_2$, consumption or production of water occurs due to ion species intervening in the reaction in addition to the formation of the carbon compounds. When a reaction producing water occurs, there is a problem of hydrogen production due to excess water (flooding) on a surface of the reduction electrode. Furthermore, when a reaction consuming water occurs, there is a problem of cell degradation due to drying of the diaphragm and salt precipitation in the flow path. There is a need to solve these problems caused by excess water and water consumption at the reduction electrode.

DETAILED DESCRIPTION

A carbon dioxide electrolytic device according to an embodiment includes: an electrolysis cell including a reduction electrode, an oxidation electrode, a gas flow path to supply gas containing carbon dioxide to the reduction electrode, a liquid flow path to supply an electrolytic solution containing water or water vapor to the oxidation electrode, and a diaphragm separating the reduction electrode from the oxidation electrode; a first supply path connected to the gas flow path to supply the gas to the reduction electrode; a first discharge path connected to the gas flow path to discharge at least products produced at the reduction electrode, a first moisture content detecting unit installed in the first discharge path to detect a moisture content in the gas flowing in the first discharge path; a moisture content adjusting unit configured to adjust a moisture content supplied to the reduction electrode; and a control unit configured to control the moisture content adjusting unit based on a detection signal of the first moisture content detecting unit.

Hereinafter, a carbon dioxide electrolytic device of an embodiment will be explained with reference to the drawings. In each embodiment presented below, substantially the same components are denoted by the same codes, and a description thereof is sometimes partially omitted. The drawings are schematic, and a relationship between a thickness and a planar size, thickness proportions of the respective portions, and the like are sometimes different from actual ones.

First Embodiment

Figure 1:
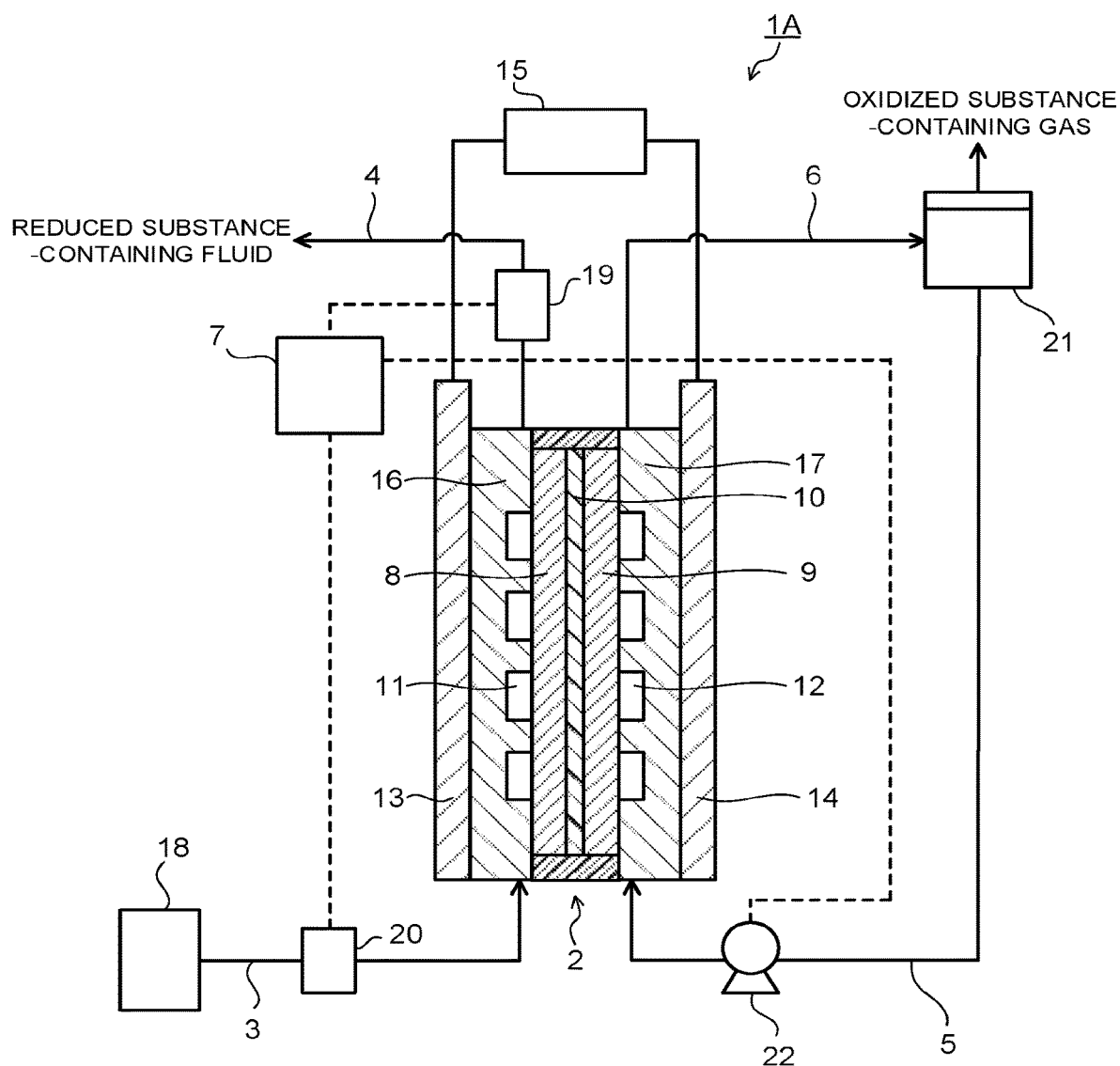
FIG. 1 is a diagram illustrating a carbon dioxide electrolytic device according to a first embodiment.

A carbon dioxide electrolytic device 1 (1A) of a first embodiment will be explained with reference to FIG. 1. The carbon dioxide electrolytic device 1A illustrated in FIG. 1 includes an electrolysis cell 2, a first supply path 3 supplying gas containing carbon dioxide ($CO_2$) (hereinafter sometimes simply referred to as $CO_2$ gas) to the electrolysis cell 2, a first discharge path 4 discharging gas containing products produced by a reduction reaction of $CO_2$ at the electrolysis cell 2, a second supply path 5 supplying an electrolytic solution containing water ($H_2O$) or water vapor to the electrolysis cell 2, a second discharge path 6 discharging products produced by an oxidation reaction of $H_2O$ at the electrolysis cell 2 together with the electrolytic solution, and a control unit 7 controlling operations, and the like of each unit. The control unit 7 is formed by a computer, such as a PC or a microcomputer, for example, which calculates and processes data signals output by each unit as described below, and outputs necessary control signals to component units.

The electrolysis cell 2 includes a reduction electrode (cathode) 8, an oxidation electrode (anode) 9, a diaphragm 10, a gas flow path 11 distributing gas containing $CO_2$ to supply to the reduction electrode 8 while keeping in contact with the reduction electrode 8, a liquid flow path 12 distributing an electrolytic solution (anode solution) containing water to supply to the oxidation electrode 9 while keeping in contact with the oxidation electrode 9, a first current collector plate 13 electrically connected to the reduction electrode 8, and a second current collector plate 14 electrically connected to the oxidation electrode 9. The first and second current collector plates 13 and 14 of the electrolysis cell 2 are electrically connected to a power supply 15.

The reduction electrode 8 is an electrode (cathode) that causes a reduction reaction of carbon dioxide ($CO_2$) to produce carbon compounds such as carbon monoxide (CO), methane ($CH_4$), ethane ($C_2H_6$), ethylene ($C_2H_4$), methanol ($CH_3OH$), ethanol ($C_2H_5OH$), and ethylene glycol ($C_2H_6O_2$). In the reduction electrode 8, a side reaction may occur to produce hydrogen ($H_2$) through a reduction reaction of water ($H_2O$) simultaneously with the reduction reaction of $CO_2$. The reduction electrode 8 contains a reduction catalyst, for example, to produce the carbon compounds through the reduction reaction of carbon dioxide. A material that decreases activation energy for reducing carbon dioxide is used as the reduction catalyst. In other words, a material that decreases overvoltage in producing the carbon compounds through the reduction reaction of carbon dioxide is used.

For example, a metal material or carbon material can be used for the reduction electrode 8 containing the reduction catalyst. For example, metals such as gold, aluminum, copper, silver, platinum, palladium, zinc, mercury, indium, nickel, and titanium, alloys containing such metals, and the like can be used as the metal materials. For example, graphene, carbon nanotubes (CNT), fullerenes, ketjen black, and the like can be used as the carbon materials. Not limited to the above, for example, metal complexes such as Ru complexes or Re complexes, or organic molecules having an imidazole skeleton or a pyridine skeleton can also be used as the reduction catalyst. The reduction catalyst may be a mixture of multiple materials. The reduction electrode 8 may have a structure where the reduction catalyst in thin-film, lattice, particle, wire, or other shapes is provided on a conductive substrate, for example.

The reduction electrode 8 has, for example, a gas diffusion layer and a reduction catalyst layer. A porous layer, which is denser than the gas diffusion layer, may be disposed between the gas diffusion layer and the reduction catalyst layer. The gas diffusion layer is disposed on the gas flow path 11 side, and the reduction catalyst layer is disposed on the diaphragm 10 side. The reduction catalyst layer preferably has catalytic nanoparticles, catalytic nanostructures, or the like. The gas diffusion layer is formed by, for example, carbon paper, carbon cloth, or the like, and is subjected to a water-repellent treatment. A solid electrolyte, which serves as a movement path for ion species, as well as water-repellent components, can be introduced into the reduction catalyst layer as needed. The electrolytic solution and ions are supplied to the reduction catalyst layer from the oxidation electrode 9 through the diaphragm 10. In the gas diffusion layer, the $CO_2$ gas is supplied from the gas flow path 11 and the products of the reduction reaction of the $CO_2$ gas are discharged. The reduction reaction of $CO_2$ occurs near a boundary between the gas diffusion layer and the reduction catalyst layer, and gaseous products are discharged from the gas flow path 11.

The oxidation electrode 9 is an electrode (cathode) that oxidizes substances to be oxidized such as substances and ions in the electrolytic solution (anode solution) containing water. For example, the oxidation electrode 9 oxidizes water ($H_2O$) to produce oxygen or a hydrogen peroxide solution, or oxidizes chloride ions ($Cl^-$) to produce chlorine. The oxidation electrode 9 contains an oxidation catalyst for the substances to be oxidized. A material that decreases activation energy when oxidizing the substances to be oxidized, in other words, a material that decreases reaction overvoltage is used as the oxidation catalyst.

Such oxidation catalyst materials include, for example, metals such as ruthenium, iridium, platinum, cobalt, nickel, iron, and manganese. Binary metal oxides, ternary metal oxides, quaternary metal oxides, and other metal oxides can also be used. Examples of the binary metal oxide include, for example, manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include, for example, Ni—Fe—O, Ni—Co—O, La—Co—O, Ni—La—O, Sr—Fe—O, and so on. Examples of the quaternary metal oxide include, for example, Pb—Ru—Ir—O, La—Sr—Co—O, and so on. Not limited to the above, metal hydroxides containing cobalt, nickel, iron, manganese, and so on, and metal complexes such as Ru complexes and Fe complexes can also be used as the oxidation catalyst. Multiple materials may also be used in a mixture.

The oxidation electrode 9 can be a composite material that contains both the oxidation catalyst and a conductive material. Examples of the conductive material include, for example, carbon materials such as carbon black, activated carbon, fullerenes, carbon nanotubes, graphene, ketjen black, and diamond, transparent conductive oxides such as indium tin oxide (ITO), zinc oxide (ZnO), fluorine-doped tin oxide (FTO), aluminum-doped zinc oxide (AZO), and antimony-doped tin oxide (ATO), metals such as Cu, Al, Ti, Ni, Ag, W, Co, and Au, and alloys containing these metals. The oxidation electrode 9 may have a structure where the oxidation catalyst in thin-film, lattice, particle, wire, or other shapes is provided on a conductive substrate, for example. For example, a metal material containing titanium, titanium alloy, or stainless steel is used as the conductive substrate. In the oxidation electrode 9, a solid electrolyte, which serves as a movement path for ion species, as well as water-repellent components can be introduced as needed.

A membrane that can selectively permeate anions or cations is used for the diaphragm 10. An ion exchange membrane such as, for example, Neosepta (registered trademark) manufactured by ASTOM Corporation, Selemion (registered trademark) and Aciplex (registered trademark) manufactured by ASAHI GLASS CO., LTD., Fumasep (registered trademark) and Fumapem (registered trademark) manufactured by Fumatech, Nafion (registered trademark) being a fluorine resin made by sulfonating and polymerizing tetrafluoroethylene manufactured by Du Pont, Lewabrane (registered trademark) manufactured by LANXESS, ION-SEP (registered trademark) manufactured by IONTECH, Mustang (registered trademark) manufactured by PALL, Ralex (registered trademark) manufactured by Mega, or Gore-Tex (registered trademark) manufactured by GORE-TEX can be used as the diaphragm 10. The ion-exchange membrane may be formed by using a membrane with a hydrocarbon basic structure or a membrane with an amine group in anion exchange. A bipolar membrane where a cation-exchange membrane and an anion-exchange membrane are stacked may be used for the diaphragm 10.

In addition to the ion-exchange membrane, the diaphragm 10 can be formed by using, for example, a silicone resin, a fluorine-based resin (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE), and the like), polyestersulfone (PES), a porous ceramic membrane, a filling filled with glass filters or agar, and an insulating porous material such as zeolite and oxide. Furthermore, a hydrophilic porous membrane is preferably used as the diaphragm 10 because it does not get clogged by bubbles.

The power supply 15 provides the electrolysis cell 2 with electric power to cause the oxidation-reduction reaction, and is electrically connected to the reduction electrode 8 and the oxidation electrode 9. The electric energy supplied by the power supply 15 is used for the reduction reaction by the reduction electrode 8 and the oxidation reaction by the oxidation electrode 9. The power supply 15 is connected to the reduction electrode 8, and the power supply 15 is connected to the oxidation electrode 9, for example, by wiring. Inverters, converters, batteries, or the like may be installed between the electrolysis cell 2 and the power supply 15 as necessary. A drive system of the electrolysis cell 2 may be a constant voltage system or a constant current system.

The power supply 15 may be an ordinary commercial power supply, a battery, and the like, or a power supply that supplies renewable energy by converting it into electric energy. Examples of such a power supply include a power supply that convert kinetic energy or positional energy such as wind, hydraulic, geothermal, and tidal power into electric energy, a power supply such as a solar cell with a photoelectric conversion element that converts light energy into electric energy, a power supply such as a fuel cell and a storage battery that converts chemical energy into electric energy, and a device that converts vibrational energy such as sound into electric energy. The photoelectric conversion element has a function of performing charge separation by the light energy such as irradiated sunlight or the like. Examples of the photoelectric conversion element include a pin junction solar cell, a pn junction solar cell, an amorphous silicon solar cell, a multijunction solar cell, a single-crystal silicon solar cell, a polycrystalline silicon solar cell, a dye-sensitized solar cell, an organic thin-film solar cell, and so on The reduction electrode 8 is disposed so that one surface faces the gas flow path 11 where the $CO_2$ gas is distributed and the other surface is in contact with the diaphragm 10. The gas flow path 11 is formed by a pit (groove/recess) provided on a first flow path plate 16. A material with low chemical reactivity and high electrical conductivity is preferably used for the first flow path plate 16 that forms the gas flow path 11. Such materials include metal materials such as Ti and SUS, carbon materials, and the like. The first current collector plate 13 is in electrical contact with a surface of the first flow path plate 16 on the opposite side of the reduction electrode 8. The first flow path plate 16 has an introducing port of the gas flow path 11 for introducing the gas and a discharging port for discharging produced gas, and so on, which are not illustrated in the drawing. The first supply path 3, which supplies the $CO_2$ gas, is connected to the introducing port of the gas flow path 11. The first discharge path 4, which discharges the gas containing the products produced by the $CO_2$ reduction reaction is connected to the discharging port of the gas flow path 11.

The oxidation electrode 9 is disposed so that one surface faces the liquid flow path 12 where the electrolytic solution containing water (anode solution) is distributed, and the other surface is in contact with the diaphragm 10. The liquid flow path 12 is formed by a pit (groove/recess) provided on a second flow path plate 17. A material with low chemical reactivity and high electrical conductivity is preferably used for the second flow path plate 17 that forms the liquid flow path 12. Such materials include metal materials such as Ti and SUS, carbon materials, and the like. The second current collector plate 14 is in electrical contact with a surface of the second flow path plate 17 on the opposite side of the oxidation electrode 9. The second flow path plate 17 has an introducing port of the liquid flow path 12 for introducing the anode solution and a discharging port of the liquid flow path 12 for discharging the anode solution, the products, and so on, which are not illustrated in the drawing. The second supply path 5, which supplies the anode solution, is connected to the introducing port of the liquid flow path 12. The second discharge path 6, which discharges the anode solution, $O_2$, and other products produced by the oxidation reaction is connected to the discharging port of the liquid flow path 12. The first flow path plate 16 and the second flow path plate 17 are provided with screw holes, or the like for tightening. Packing, not illustrated, and the like is sandwiched between a front and a rear of each of the flow path plates 16 and 17 as necessary.

The electrolytic solution used as the anode solution can be a solution using water ($H_2O$), for example, an aqueous solution containing any electrolyte. This solution is preferably an aqueous solution that promotes the oxidation reaction of water. Examples of the aqueous solution containing the electrolyte include, for example, aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), carbonate ions ($CO_3^-$), hydroxide ions ($OH^-$), and the like.

The electrolytic solution can be an ionic liquid or an aqueous solution of the ionic liquid, which is made of salts of cations such as imidazolium ions or pyridinium ions and anions such as $BF_4^-$ or $PF_6^-$, for example, and is in a liquid state over a wide temperature range. Furthermore, examples of other electrolytic solutions include an amine solution such as ethanolamine, imidazole, and pyridine or an aqueous solution of the amine solution. Examples of amine include primary amine, secondary amine, tertiary amine, and so on. These electrolytic solutions may have high ionic conductivity, a property of absorbing carbon dioxide, and a property of lowering reduction energy.

Examples of the primary amine include methylamine, ethylamine, propylamine, butylamine, pentylamine, hexylamine, and the like. The hydrocarbon of the amine may be substituted by alcohol, halogen, or the like. Examples of amine whose hydrocarbon is substituted include methanolamine, ethanolamine, chloromethylamine, and the like. Furthermore, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and the like. The substituted hydrocarbons may be different. This also applies to the tertiary amine. Examples with different hydrocarbons include methylethylamine, methylpropylamine, and the like.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyl diethylamine, methyldipropylamine, and the like.

Examples of the cation of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, a 1-hexyl-3-methylimidazolium ion, and the like.

A 2-position of the imidazolium ion may be substituted. Examples of the cation in which the 2-position of the imidazolium ion is substituted include a 1-ethyl-2,3-dimethylimidazolium ion, a 1,2-dimethyl-3-propylimidazolium ion, 1-butyl-2,3-dimethylimidazolium ion, a 1,2-dimethyl-3-pentylimidazolium ion, a 1-hexyl-2,3-dimethylimidazolium ion, and the like.

Examples of the pyridinium ion include methylpyridinium, ethylpyridinium, propylpyridinium, butylpyridinium, pentylpyridinium, hexylpyridinium, and the like. In both the imidazolium ion and the pyridinium ion, an alkyl group may be substituted, or an unsaturated bond may exist.

A $CO_2$ gas supply unit 18 is connected to the first supply path 3. A first moisture content detecting unit 19 that detects a moisture content in the gas flowing through the first discharge path 4 is provided in the first discharge path 4. A second moisture content detecting unit 20 is also provided in the first supply path 3, as necessary. The first and second moisture content detecting units 19, 20 are electrically connected to the control unit 7, respectively. For example, a dew-point meter such as a mirror-cooled dew-point meter or an electrostatic capacitance dew-point meter is used for the first and second moisture content detecting units 19, 20. The first and second moisture content detecting units 19, 20 may be formed by a hygrometer and a thermometer. When the second moisture content detecting unit 20 is provided, a moisture content produced or consumed at the reduction electrode 8 can be estimated from a difference (M1–M2) between a moisture content M1 detected by the first moisture content detecting unit 19 and a moisture content M2 detected by the second moisture content detecting unit 20. When a moisture content in the gas supplied from the first supply path 3 is known in advance, the second moisture content detecting unit 20 does not need to be provided, and the moisture content produced or consumed can be estimated using only the first moisture content detecting unit 19. The first and second moisture content detecting units 19, 20 may include a flowmeter to measure a flow speed of the gas. The moisture content in the gas can be quantified by using the dew-point meter or other devices and the flowmeter.

A gas-liquid separator 21 is provided in the second discharge path 6. The anode solution, which contains the products produced at the oxidation electrode 9, discharged from the second discharge path 6 is sent to the gas-liquid separator 21. The products at the oxidation electrode 9, such as oxygen ($O_2$), are separated in the gas-liquid separator 21 and sent out of a system to be collected or released into the atmosphere. The anode solution from which the products at the oxidation electrode 9 have been separated is sent from the gas-liquid separator 21 to the second supply path 5. A pump 22 is provided in the second supply path 5. The anode solution is circulated through the second supply path 5, the pump 22, the liquid flow path 12 of the electrolysis cell 2, the second discharge path 6, and the gas-liquid separator 21. The pump 22 is electrically connected to the control unit 7, and output (discharge force of the anode solution) of the pump 22 is controlled by the control unit 7, as described below.

The carbon dioxide electrolytic device 1 of the embodiment further includes a moisture content adjusting unit that adjusts a moisture content supplied to the reduction electrode 8. In the carbon dioxide electrolytic device 1A of the first embodiment, the pump 22, whose output (discharge force of the anode solution) is controlled by the control unit 7, constitutes the moisture content adjusting unit. In other words, detection signals (data signals) from the first and second moisture content detecting units 19, 20 are sent to the control unit 7, which outputs a control signal to the pump 22 as the moisture content adjusting unit based on the detection signals. The control unit 7 has pre-stored request criteria for the data signals sent from the first and second moisture content detecting units 19, 20, that is, request criteria based on a correlation between the moisture content at the reduction electrode 8 and the data signals, for example, and the control signal is output from the control unit 7 to the pump 22 based on a relationship between the request criteria and the data signals.

When the detection signal of the moisture content is lower than the request criteria, that is, when the moisture content of the reduction electrode 8 is lower than a reference value, the control signal is sent from the control unit 7 to the pump 22 to increase the output. Increasing an amount of the anode solution supplied to the liquid flow path 12 increases a pressure in the liquid flow path 12, which increases a moisture content that moves to the reduction electrode 8 through the diaphragm 10. Conversely, when the detection signal of the moisture content is higher than the required criteria, that is, when the moisture content of the reduction electrode 8 is higher than the reference value, the control signal is sent from the control unit 7 to the pump 22 to decrease the output. Decreasing the amount of anode solution supplied to the liquid flow path 12 decreases the pressure in the liquid flow path 12, which decreases the moisture content that moves to the reduction electrode 8 through the diaphragm 10.

Next, operations of the carbon dioxide electrolytic device 1 will be explained. Here, a case is mainly explained where a potassium hydrogen carbonate solution is used as the electrolytic solution, carbon dioxide ($CO_2$) is reduced to produce mainly carbon monoxide (CO), and water ($H_2O$) is oxidized to produce oxygen ($O_2$). The carbon compound as the reduction product of carbon dioxide is not limited to carbon monoxide, but can also be organic carbon compounds such as $CH_4$, $C_2H_6$, $C_2H_4$, $CH_3OH$, $C_2H_5OH$, and $C_2H_6O_2$. When a voltage greater than a bath voltage is applied between the reduction electrode 8 and the oxidation electrode 9 from the power supply 15, the oxidation reaction of water ($H_2O$) occurs near the oxidation electrode 9 in contact with the electrolytic solution in the liquid flow path 12. As shown in Equation (1) below, the oxidation reaction of $H_2O$ contained in the electrolytic solution occurs, electrons are lost, and oxygen ($O_2$) and hydrogen ions ($H^+$) are produced. A part of the produced hydrogen ions ($H^+$) moves to the reduction electrode 8 through the diaphragm.

$$2H_2O \rightarrow 4H^+ + O_2 + 4e^- \qquad (1)$$

$H^+$ produced at the oxidation electrode 9 move through the electrolytic solution present in the oxidation electrode 9 and the diaphragm 10, and reach near the reduction electrode 8. Electrons ($e^-$) based on the current supplied to the reduction electrode 8 from the power supply 15 and $H^+$ that moved near the reduction electrode 8 cause the reduction reaction of carbon dioxide ($CO_2$). Specifically, as shown in Equation (2) below, $CO_2$ supplied to the reduction electrode 8 from the gas flow path 11 is reduced to produce CO. Furthermore, as shown in Equation (3) below, hydrogen ions ($H^+$) may be reduced to produce hydrogen as a side reaction.

$$2CO_2 + 4H^+ + 4e^- \rightarrow 2CO + 2H_2O \qquad (2)$$

$$2H^+ + 2e^- \rightarrow H_2 \qquad (3)$$

When the pH near the reduction electrode 8 is in an alkaline environment, water and carbon dioxide may be reduced to produce carbon monoxide and hydroxide ions, as shown in Equation (4) below. In addition, hydrogen is produced by a reaction of Equation (5) as a side reaction.

$$2CO_2 + 2H_2O + 4e^- \rightarrow 2CO + 4OH^- \tag{4}$$

$$2H_2O + 2e^- \rightarrow H_2 + 2OH^- \tag{5}$$

The produced hydroxide ions move to the oxidation electrode 9 through the diaphragm 10, and a reaction occurs in which the hydroxide ions are oxidized at the oxidation electrode 9 to produce oxygen, as shown in Equation (6) below.

$$4OH^- \rightarrow 2H_2O + O_2 + 4e^- \tag{6}$$

The hydroxide ions produced in Equation (4) may also react with $CO_2$ present near the reduction electrode 8 to form bicarbonate ions and hydrogen carbonate ions, which move to the oxidation electrode 9. Furthermore, water is reduced to produce hydrogen as a side reaction.

As shown in Equation (2) or Equation (4), the reaction in which water is produced or consumed occurs at the reduction electrode 8 when the reduction reaction of $CO_2$ described above proceeds. When there is a large amount of water near the reduction electrode 8, the supply of $CO_2$ to the reduction electrode 8 will be stagnant, and the production of hydrogen, which is the side reaction, will proceed predominantly, resulting in a decrease in $CO_2$ reduction efficiency. On the other hand, when there is less amount of water near the reduction electrode 8, the diaphragm 10 deteriorates due to drying, or the electrolyte components that have moved from the oxidation electrode 9 through the diaphragm 10 precipitate as salts in the gas flow path 11, blocking the gas flow path 11, and stopping the supply of $CO_2$. These are all factors that can degrade the electrolysis cell 2.

In the carbon dioxide electrolytic device 1A of the first embodiment, the detection signals (data signals) from the first and second moisture content detecting units 19, 20 are sent to the control unit 7 as described above, and the control signal is output to the pump 22 as the moisture content adjusting unit based on the detection signals. The control unit 7 sends the control signal to the pump 22 based on the relationship between the data signals sent from the first and second moisture content detecting units 19, 20 and the required criteria, and controls the output (discharge force of the electrolytic solution) of the pump 22. By controlling the output of the pump 22, the amount of the electrolytic solution supplied to the liquid flow path 12 is increased or decreased, and the pressure in the liquid flow path 12 is increased or decreased based on the supply amount. Therefore, the moisture content of the reduction electrode 8 can be adjusted, and the above-mentioned decrease in the $CO_2$ reduction efficiency, drying of the diaphragm 10, precipitation of salts in the gas flow path 11, and so on can be suppressed. These make it possible to provide the carbon dioxide electrolytic device 1A with improved reduction efficiency and durability. In the first embodiment, the movement of water from the oxidation electrode 9 is adjusted by controlling the flow rate of the pump 22. However, the movement of water from the oxidation electrode 9 to the reduction electrode 8 may be controlled by providing, for example, a variable throttle valve as a back pressure regulating valve in the second discharge path 6 to control the pressure at the oxidation electrode 9.

Second Embodiment

Figure 2:
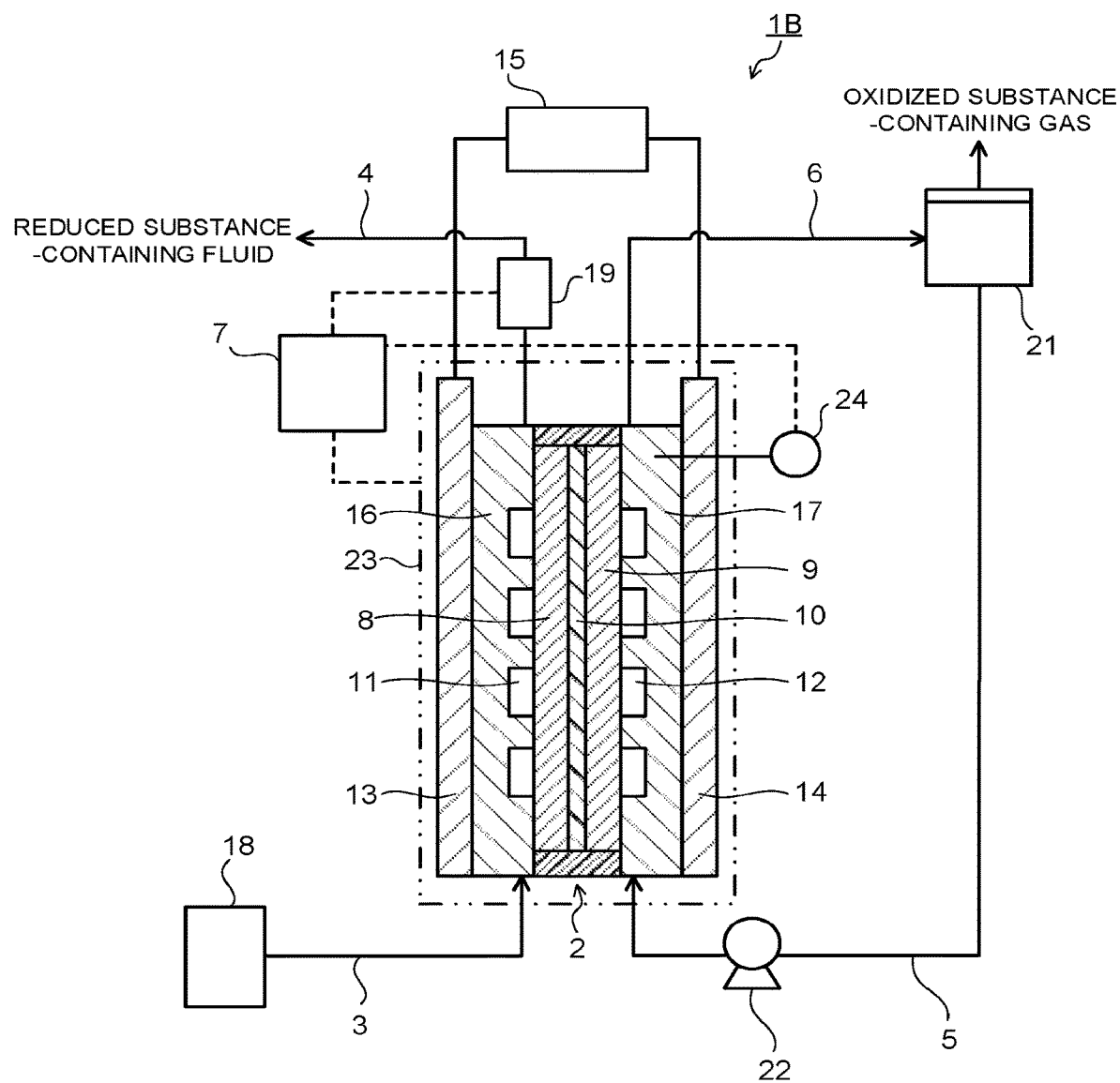
FIG. 2 is a diagram illustrating a carbon dioxide electrolytic device according to a second embodiment.

A carbon dioxide electrolytic device 1B of a second embodiment will be explained with reference to FIG. 2. The carbon dioxide electrolytic device 1B illustrated in FIG. 2 is provided with only the first moisture content detecting unit 19 in the first discharge path 4 as the detecting unit, and a temperature regulator 23 of the electrolysis cell 2 as the moisture content adjusting unit. Furthermore, a temperature measuring device 24 is installed in the electrolysis cell 2. The temperature measuring device 24 may be installed on either the reduction electrode 8 side or the oxidation electrode 9 side, but is preferably installed on the oxidation electrode 9 side. Other than the above, the carbon dioxide electrolytic device 1B of the second embodiment has the same configuration as that of the first embodiment.

In the carbon dioxide electrolytic device 1B of the second embodiment, the first moisture content detecting unit 19 disposed in the first discharge path 4 is electrically connected to the control unit 7. The control unit 7 is connected to the temperature regulator 23 that regulates the temperature of the electrolysis cell 2. In the second embodiment, it is assumed that the moisture content in the $CO_2$ gas supplied to the first supply path 3 is known, in which case the moisture content near the reduction electrode 8 can be ascertained only by the first moisture content detecting unit 19 in the first discharge path 4.

Adjusting the moisture content at the reduction electrode 8 by controlling a moving amount of moisture from the oxidation electrode 9 through the diaphragm 10 is the same as in the first embodiment, but in the second embodiment, the same effect is obtained by regulating the temperature of the electrolysis cell 2. A heater, cooler, or the like in contact with the electrolysis cell 2 can be used as the temperature regulator 23. The temperature regulator 23 does not have to be in direct contact with the electrolysis cell 2, but it may be installed in the first supply path 3, the second supply path 5, or the second discharge path 6, and may indirectly regulate the temperature of the electrolysis cell 2 by heating or cooling the gas or electrolytic solution.

Third Embodiment

Figure 3:
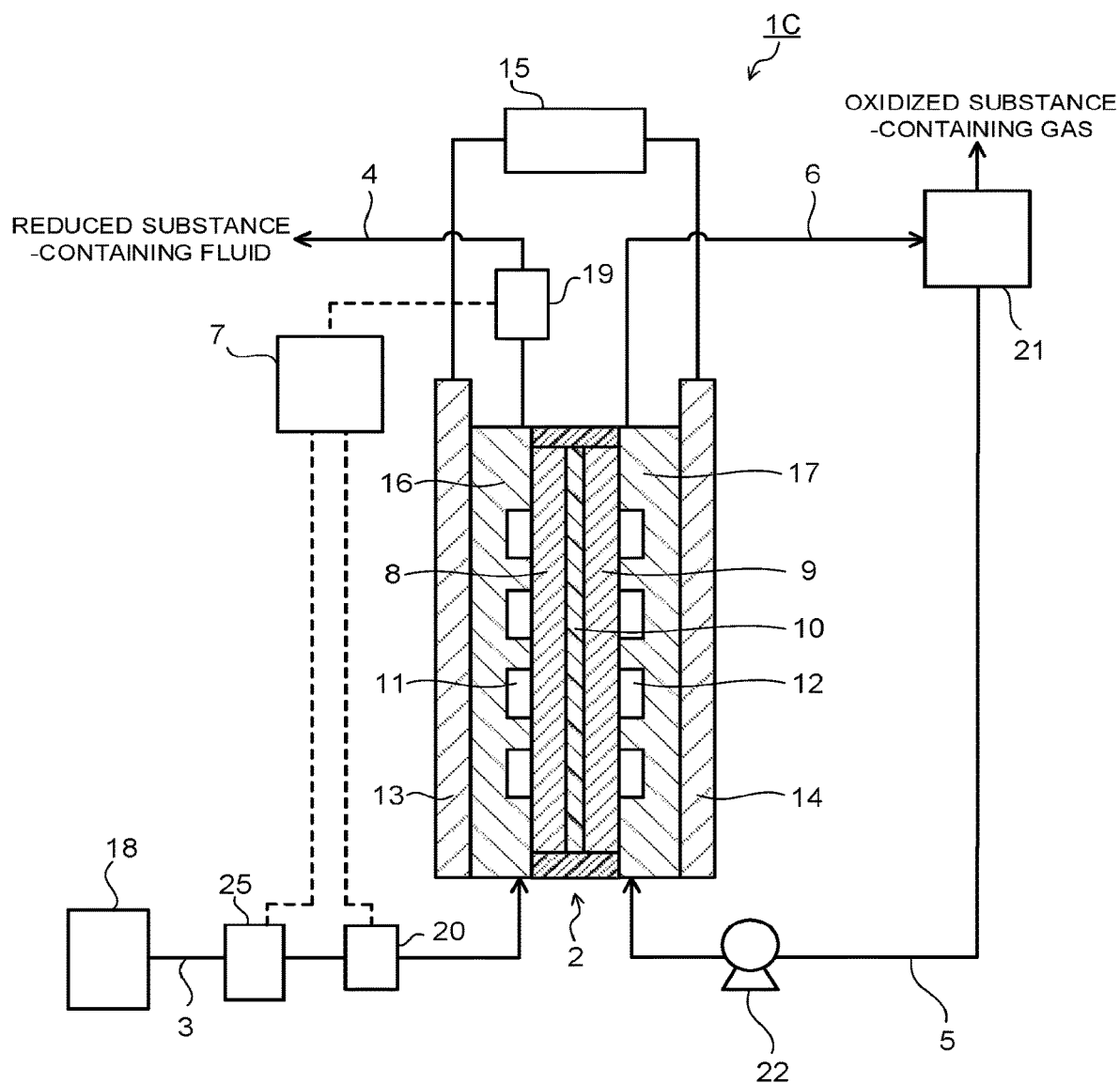
FIG. 3 is a diagram illustrating a carbon dioxide electrolytic device according to a third embodiment.

A carbon dioxide electrolytic device of a third embodiment will be explained with reference to FIG. 3. A carbon dioxide electrolytic device 1C illustrated in FIG. 3 includes the first moisture content detecting unit 19 and the second moisture content detecting unit 20, and a humidity regulator (humidistat) 25 is provided in the first supply path 3 as the moisture content adjusting unit. The humidity regulator 25 has a function of humidifying or dehumidifying the gas to adjust the moisture content (dew-point temperature) in the gas. Although the humidity regulator 25 may have only the humidifying function, both the humidifying and dehumidifying functions are preferably held. Other than the above, the carbon dioxide electrolytic device 1C of the third embodiment has the same configuration as the first embodiment. As illustrated in FIG. 3, the detection signals detected by the first and second moisture content detecting units 19, 20 are sent to the control unit 7, which controls operations of the humidity regulator 25 being the moisture content adjusting unit. In other words, the moisture content in the $CO_2$ gas flowing in the first supply path 3 is adjusted.

In the third embodiment, the moisture content in the reduction electrode 8 is kept in a proper range by adjusting the moisture content in the $CO_2$ gas flowing through the first supply path 3 with the humidity regulator 25 according to the moisture content of the reduction electrode 8, instead of adjusting the moving amount of moisture from the oxidation electrode 9 to the reduction electrode 8, which is different from the first and second embodiments. Such means and method of adjusting the moisture content also make it possible to provide a highly efficient and durable carbon dioxide electrolytic device 1C, as in the first and second embodiments.

Fourth Embodiment

Figure 4:
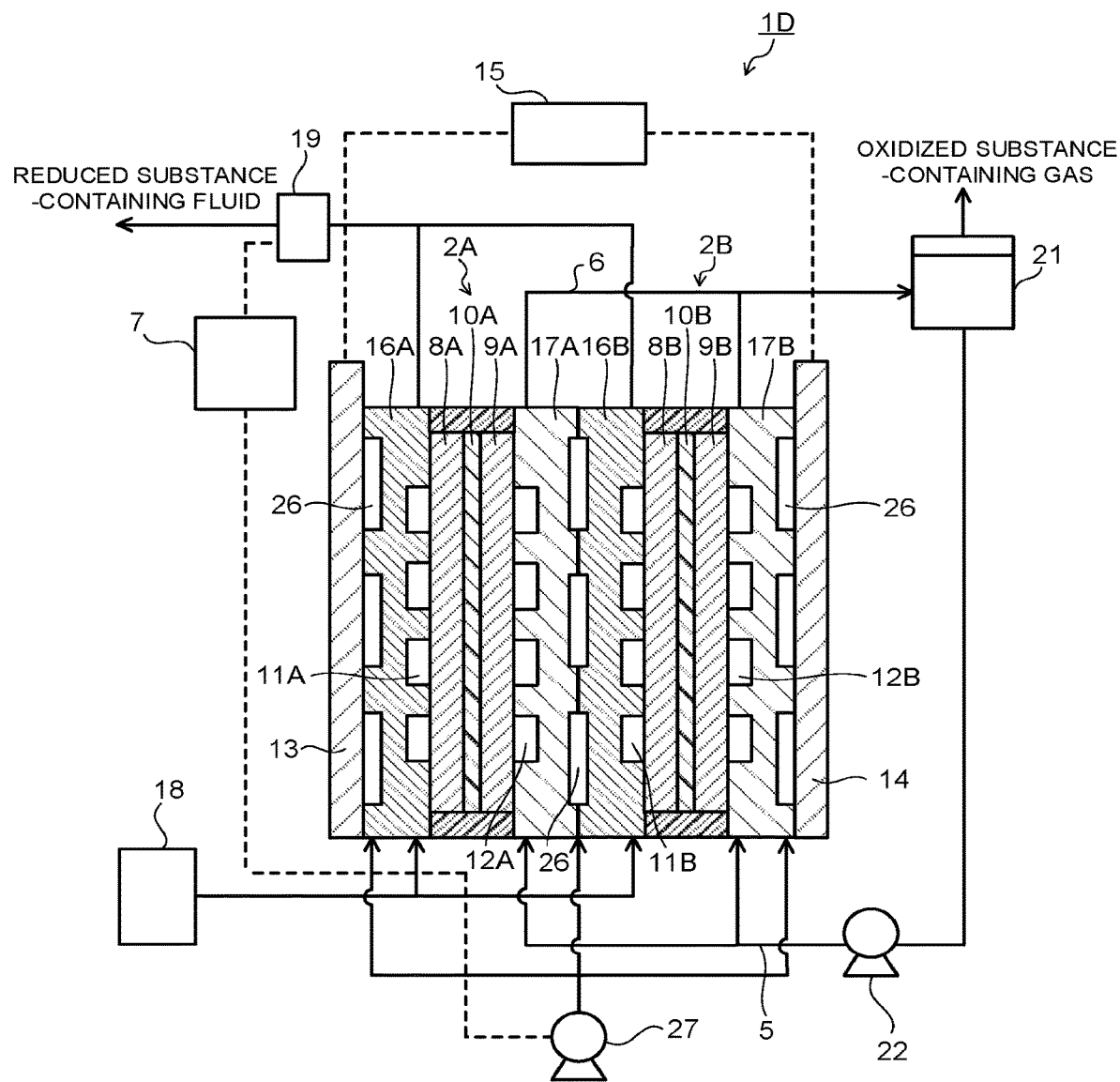
FIG. 4 is a diagram illustrating a carbon dioxide electrolytic device according to a fourth embodiment.

A carbon dioxide electrolytic device 1D of a fourth embodiment will be explained with reference to FIG. 4. The carbon dioxide electrolytic device 1D illustrated in FIG. 4 includes a stack cell where two electrolysis cells 2A, 2B are stacked. That is, the stack cell has a structure where a first flow path plate 16A, a reduction electrode 8A, a diaphragm 10A, an oxidation electrode 9A, a second flow path plate 17A, a first flow path plate 16B, a reduction electrode 8B, a diaphragm 10B, an oxidation electrode 9B, and a second flow path plate 17B are stacked in this order. The first flow path plates 16A, 16B are each formed by a porous conductive material. A groove that serves as a cooling water flow path 26 is formed on each surface of the first flow path plates 16A, 16B opposite to each surface in contact with the reduction electrodes 8A, 8B. A cooling water pump 27 is provided to supply cooling water to the cooling water flow path 26. In consideration of cooling efficiency of the electrolysis cells 2A, 2B (stack cell), the cooling water flow path 26 may also be provided in the second flow path plate 17B. Other than the above, the carbon dioxide electrolytic device 1D of the fourth embodiment has the same configuration as that of the first embodiment.

The carbon dioxide electrolytic device 1D of the fourth embodiment has a stacked structure with the stacked two electrolysis cells 2A, 2B. In such a case, it is preferable to flow cooling water inside each of the two electrolysis cells 2A, 2B to remove heat, since generation of heat due to the stacking becomes remarkable and causes a decrease in the efficiency of the $CO_2$ reduction reaction. In this case, the moisture content of the reduction electrodes 8A, 8B can be adjusted by forming the first flow path plates 16A, 16B by the porous conductive material, and moving moisture of the cooling water flowing through the cooling water flow path 26 to the reduction electrodes 8A, 8B. In the fourth embodiment, the detection signal of the first moisture content detecting unit 19 is sent to the control unit 7, and the control unit 7 controls a flow rate of the cooling water pump 27 based on the detection signal. By increasing or decreasing the flow rate of the cooling water, a pressure in the cooling water flow path 26 is changed. A moisture content moving from the cooling water flow path 26 through the porous first flow path plates 16A, 16B can be thereby adjusted to keep the moisture contents of the reduction electrodes 8A, 8B in a proper range. Therefore, it is possible to provide the carbon dioxide electrolytic device 1D with high efficiency and excellent durability as same as in the first to third embodiments.

EXAMPLES

Next, examples and evaluation results thereof are described.

Example 1

As illustrated in FIG. 2, the carbon dioxide electrolytic device that was equipped with the first moisture content detecting unit in the first discharge path was fabricated. For a verification experiment, the second moisture content detecting unit was provided in the first supply path. A dew-point meter and a flowmeter were used for the first and second moisture content detecting units to measure the moisture content in the gas discharged from the electrolysis cell.

First, the carbon dioxide electrolytic device was used to verify whether the moisture content at the reduction electrode could be controlled by controlling a temperature of a heater provided at the electrolysis cell. In this verification experiment, reading of the detecting unit and operations of the adjusting unit were artificially manipulated without activating the control unit.

As the reduction electrode for the electrolysis cell, an electrode was used in which a mixed solution composed of carbon particles supporting gold nanoparticles, Nafion solution, pure water, and isopropyl alcohol were coated on carbon paper with a porous layer and dried. As the oxidation electrode, an electrode was used in which Ti mesh was coated with $IrO_2$ nanoparticles. As the diaphragm, an anion exchange membrane was used. The reduction electrode and the oxidation electrode were cut and used so that each electrode area was 16 $cm^2$. As illustrated in FIG. 2, the electrolysis cell has the structure in which the first current collector plate, the first flow path plate, the reduction electrode, the diaphragm, the oxidation electrode, the second flow path plate, and the second current collector plate were stacked in this order, and sandwiched between not-illustrated insulating sheets and support plates, to form the electrolysis cell. The heater was attached to the electrolysis cell so that it could be operated at any desired temperature.

The electrolysis cell was connected to the first and second supply paths and the first and second discharge paths, and operated under the following conditions. $CO_2$ gas (purity: >99.99%) was introduced into the first supply path at a flow rate of 40 mL/min using a mass flow controller. In addition, a potassium hydrogen carbonate solution (concentration: 0.1 M $KHCO_3$) was flowed and circulated in the second supply path at a flow rate of 10 mL/min. Next, a DC stabilized power supply was used as the power supply for the verification experiment, which was connected to the reduction electrode and the oxidation electrode, and the reduction reaction of $CO_2$ was carried out by applying a predetermined current.

A part of produced gas discharged from the first discharge path was collected and analyzed by gas chromatograph for a production amount of CO or $H_2$ gas produced by the $CO_2$ reduction reaction or the water reduction reaction. A dew-point meter and a flowmeter were used for the first and second moisture content detecting units to measure a moisture content. A moisture concentration in the gas was measured using the dew-point meter. The flow speed of the gas was measured using a soap-film flowmeter. The moisture concentration and flow rate at each point were used to calculate the moisture content in the gas in the first discharge path. Furthermore, the moisture content at the reduction electrode was evaluated by using the following equation.

Moisture content (reduction electrode)=Moisture content (first discharge path)−Moisture content (first supply path)

In this case, a moving speed of moisture per unit electrode area (ml/min/cm²) was used as the unit of the moisture content.

As a result of analysis by the first and second moisture content detecting units, gas chromatograph, and $CO_2$ sensor, only CO, $H_2$, and $CO_2$ were detected as components contained in the produced gas, and selectivity of CO (CO production amount/(CO production amount+$H_2$ production amount)) was 90% or more in all measurements.

Figure 5:
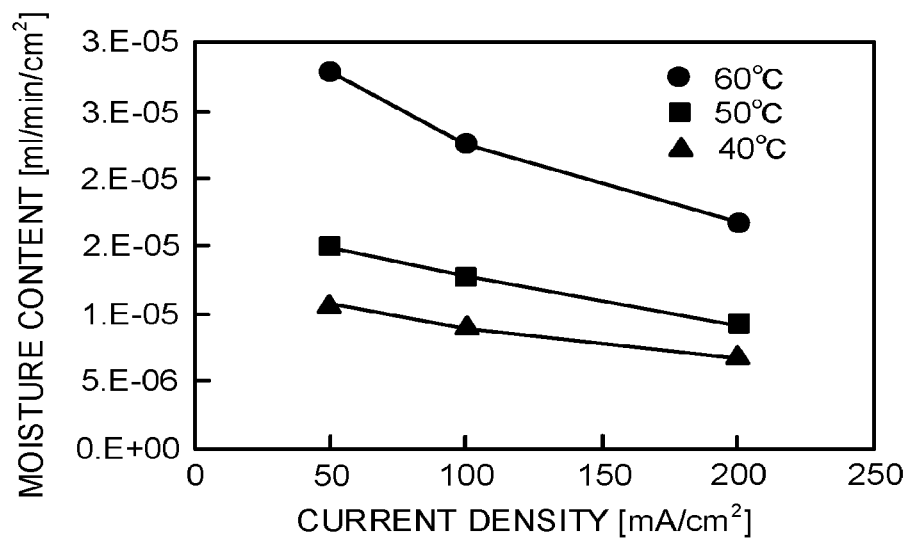
FIG. 5 is a diagram illustrating a relationship between a current density and a moisture content of a reduction electrode when a cell temperature is changed in a carbon dioxide electrolytic device of Example 1.

FIG. 5 illustrates a relationship between a current density and a moisture content at the reduction electrode when an operating temperature of the electrolysis cell is changed to 40° C., 50° C., and 60° C. It can be seen from FIG. 5 that the moisture content at the reduction electrode decreases as the current density increases at all cell temperatures. This is because as the current density increases, the $CO_2$ reduction reaction shown in Equation (4) progresses and the moisture at the reduction electrode is consumed.

It can be seen that the moisture content at the reduction electrode also increases as the cell temperature increases. This is because the moisture content at the oxidation electrode that moves through the diaphragm increases as the cell temperature increases. According to the results, the moisture content at the reduction electrode can be controlled by the cell temperature and the current density during operation. This means that the moisture content at the reduction electrode can be adjusted by measuring the moisture content at the reduction electrode using the first and second moisture content detecting units and manipulating the cell temperature and current density when the measured value deviates from a predetermined range. Therefore, a highly efficient and stable carbon dioxide electrolytic device can be provided by adjusting the moisture content at the reduction electrode.

Example 2

In Example 2, it was verified whether the moisture content at the reduction electrode could be controlled by controlling a humidification temperature of the $CO_2$ gas supplied to the electrolysis cell by using a humidistat as the moisture content adjusting unit in the carbon dioxide electrolytic device whose configuration is illustrated in FIG. 3. In the humidistat (humidifier), the $CO_2$ gas was humidified by bubbling the $CO_2$ gas in a container containing water. Here, the humidification temperature refers to a temperature of water in the container, and the higher the humidification temperature, the greater the moisture content in the gas. The evaluation was conducted by heating a pipe with a heater to prevent condensation of moisture in the $CO_2$ gas in the pipe, although not illustrated in the drawing. As in Example 1, reading of the detecting unit and operations of the adjusting unit were artificially manipulated without activating the control unit also in this verification experiment.

The same electrolysis cell as in Example 1 was used for the measurement. Operating conditions were the same as in Example 1, except that the cell was operated at the temperature of 60° C. and the current density of 200 mA/cm². The humidification temperature by the humidistat was set to 35° C., 45° C., and 55° C. for operation. As in Example 1, only CO, $H_2$, and $CO_2$ were detected as the components in the produced gas, and the selectivity of CO (CO production amount/(CO production amount+$H_2$ production amount)) was 94% or more in all measurements.

Figure 6:
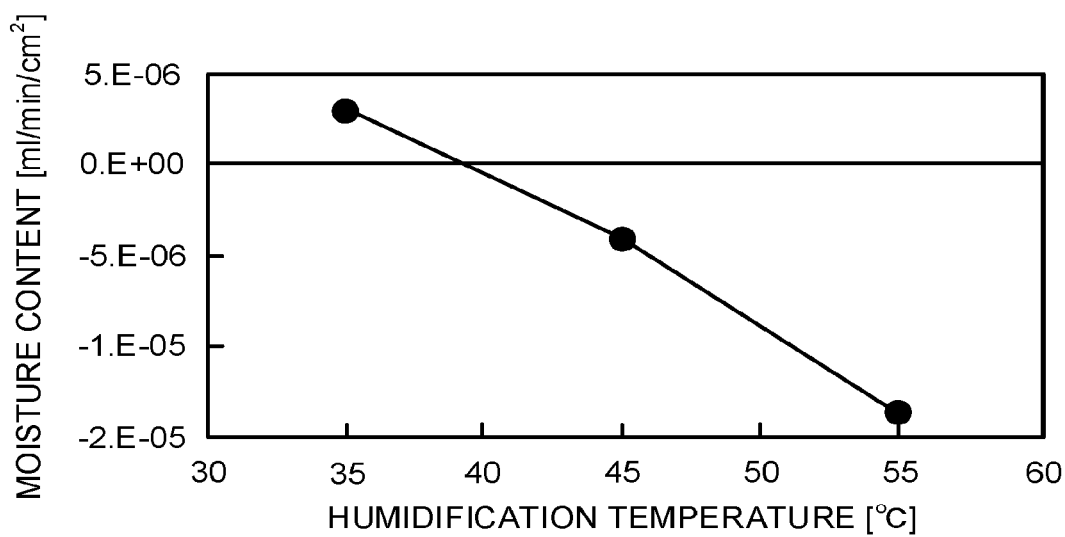
FIG. 6 is a diagram illustrating a relationship between a humidification temperature and the moisture content of the reduction electrode in a carbon dioxide electrolytic device of Example 2.

FIG. 6 illustrates the moisture content at the reduction electrode when the humidification temperature of $CO_2$ gas is changed. It can be seen from FIG. 6 that there is a correlation between the humidification temperature and the moisture content at the reduction electrode, because the moisture content at the reduction electrode decreases by increasing the humidification temperature. This means that the moisture content at the reduction electrode can be adjusted by controlling the humidification temperature of the $CO_2$ gas. Therefore, it is possible to provide a highly efficient and stable carbon dioxide electrolytic device by adjusting the moisture content at the reduction electrode.

Note that the above-described configurations in the embodiments are applicable in combination, and parts thereof are also replaceable. While certain embodiments have been described, these embodiments have been presented by way of example only, and are not intended to limit the scope of the inventions. Indeed, those embodiments may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide electrolytic device comprising:
a first electrolysis cell including a reduction electrode, an oxidation electrode, a gas flow path to supply gas containing carbon dioxide to the reduction electrode, a liquid flow path to supply an electrolytic solution containing water or water vapor to the oxidation electrode, and a diaphragm separating the reduction electrode from the oxidation electrode;
a first supply path connected to the gas flow path to supply the gas to the reduction electrode;
a first discharge path connected to the gas flow path to discharge at least products produced at the reduction electrode;
a first moisture content detecting unit installed in the first discharge path to detect a moisture content in the gas flowing in the first discharge path;
a moisture content adjusting unit configured to adjust a moisture content supplied to the reduction electrode; and
a control unit configured to control the moisture content adjusting unit based on a detection signal of the first moisture content detecting unit, wherein
the moisture content adjusting unit includes a flow rate adjusting unit configured to adjust an amount of the electrolytic solution supplied to the oxidation electrode.

2. The device according to claim 1, further comprising:
a second moisture content detecting unit installed in the first supply path to detect a moisture content in the gas flowing in the first supply path.

3. The device according to claim 1, wherein
the moisture content adjusting unit further includes a humidity regulator configured to regulate humidity in the gas flowing through the first supply path.

4. The device according to claim 1, wherein
the moisture content adjusting unit further includes a temperature regulator configured to regulate a temperature of the first electrolysis cell.

5. The device according to claim 1, wherein
the first moisture content detecting unit includes a dew-point meter.

6. The device according to claim 1, wherein
the first moisture content detecting unit includes a hygrometer and a thermometer.

7. The device according to claim 1, further comprising:
a second electrolysis cell including a reduction electrode, an oxidation electrode, a gas flow path to supply gas containing carbon dioxide to the reduction electrode, a liquid flow path to supply an electrolytic solution containing water or water vapor to the oxidation electrode, and a diaphragm separating the reduction electrode from the oxidation electrode, and being stacked on or disposed in parallel with the first electrolysis cell, wherein
the gas flow path of the second electrolysis cell is connected to the first supply path and the first discharge path.

8. A carbon dioxide electrolytic device comprising:
a first electrolysis cell including a reduction electrode, an oxidation electrode, a gas flow path to supply gas containing carbon dioxide to the reduction electrode, a liquid flow path to supply an electrolytic solution containing water or water vapor to the oxidation electrode, and a diaphragm separating the reduction electrode from the oxidation electrode;
a first supply path connected to the gas flow path to supply the gas to the reduction electrode;
a first discharge path connected to the gas flow path to discharge at least products produced at the reduction electrode;
a first moisture content detecting unit installed in the first discharge path to detect a moisture content in the gas flowing in the first discharge path;
a moisture content adjusting unit configured to adjust a moisture content supplied to the reduction electrode;
a control unit configured to control the moisture content adjusting unit based on a detection signal of the first moisture content detecting unit:
a second supply path connected to the liquid flow path to supply the electrolytic solution to the oxidation electrode:
a second discharge path connected to the liquid flow path to discharge products produced at the oxidation electrode together with the electrolytic solution; and
a pump to circulate the electrolytic solution through the second supply path, the liquid flow path, and the second discharge path, wherein
the moisture content adjusting unit includes the pump, and
the control unit is configured to adjust a flow rate of the pump based on the detection signal of the first moisture content detecting unit.

9. The device according to claim 8, further comprising:
a second moisture content detecting unit installed in the first supply path to detect a moisture content in the gas flowing in the first supply path.

10. The device according to claim 8, wherein
the first moisture content detecting unit includes a dew-point meter.

11. The device according to claim 8, wherein
the first moisture content detecting unit includes a hygrometer and a thermometer.

12. A carbon dioxide electrolytic device comprising:
a first electrolysis cell including a reduction electrode, an oxidation electrode, a gas flow path to supply gas containing carbon dioxide to the reduction electrode, a liquid flow path to supply an electrolytic solution containing water or water vapor to the oxidation electrode, and a diaphragm separating the reduction electrode from the oxidation electrode;
a first supply path connected to the gas flow path to supply the gas to the reduction electrode;
a first discharge path connected to the gas flow path to discharge at least products produced at the reduction electrode;
a first moisture content detecting unit installed in the first discharge path to detect a moisture content in the gas flowing in the first discharge path;
a moisture content adjusting unit configured to adjust a moisture content supplied to the reduction electrode;
a control unit configured to control the moisture content adjusting unit based on a detection signal of the first moisture content detecting unit;
a cooling water flow path disposed to be adjacent to the reduction electrode with a porous conductive material therebetween to adjust a temperature of the first electrolysis cell; and
a cooling water pump configured to introduce cooling water into the cooling water flow path, wherein
the moisture content adjusting unit includes the cooling water pump, and
the control unit is configured to adjust a flow rate of the cooling water pump based on a detection signal of the first moisture content detecting unit.

13. The device according to claim 12, further comprising:
a second moisture content detecting unit installed in the first supply path to detect a moisture content in the gas flowing in the first supply path.

14. The device according to claim 12, wherein
the first moisture content detecting unit includes a dew-point meter.

15. The device according to claim 12, wherein
the first moisture content detecting unit includes a hygrometer and a thermometer.

* * * * *